United States Patent Office 3,445,516
Patented May 20, 1969

3,445,516
REDUCTION OF TOLYLENE DIAMINES
James M. Cross, New Martinsville, W. Va., assignor to Mobay Chemical Company, Pittsburgh, Pa., a corporation of Delaware
No Drawing. Filed Jan. 28, 1966, Ser. No. 523,569
Int. Cl. C07c 85/14
U.S. Cl. 260—563
10 Claims

ABSTRACT OF THE DISCLOSURE

Hydrogenation of tolylene diamines is improved by charging a tolylene diamine and a member selected from the group consisting of low boilers obtained in the hydrogenation of tolylene diamine and residue obtained in the hydrogenation of tolylene diamine.

---

This invention relates to the reduction of tolylene diamine to produce hexahydrotolylene diamine.

It has been heretofore known that tolylene diamine can be reduced to produce the corresponding cycloaliphatic diamine, however, difficulty is encountered in this reduction and the yields obtained have not been satisfactory.

It is therefore an object of this invention to provide an improved method of reducing tolylene diamine. It is another object of this invention to provide a method of improving yields of cycloaliphatic diamine by the reduction of tolylene diamine.

The foregoing objects and others which will become apparent from the following description are accomplished in accordance with the invention, generally speaking, by providing a method of hydrogenating tolylene diamine wherein either the low boiler, the residue or both obtained in the hydrogenation of tolylene diamine is charged together with the tolylene diamine for the hydrogenation. That is, in addition to tolylene diamine, either low boiler, residue or both can be used. By utilizing such mixtures, the yields of hydrogenated tolylene diamine obtained are greatly improved.

The following theory is believed to be the mechanism by which the yields are improved, however, this theory is not presented herein for the purpose of limitation and should not be construed to bind the applicant. In the hydrogenation of tolylene diamine, several reactions occur and by-products are formed in addition to the reduced tolylene diamine. These reactions are set forth by the following equations:

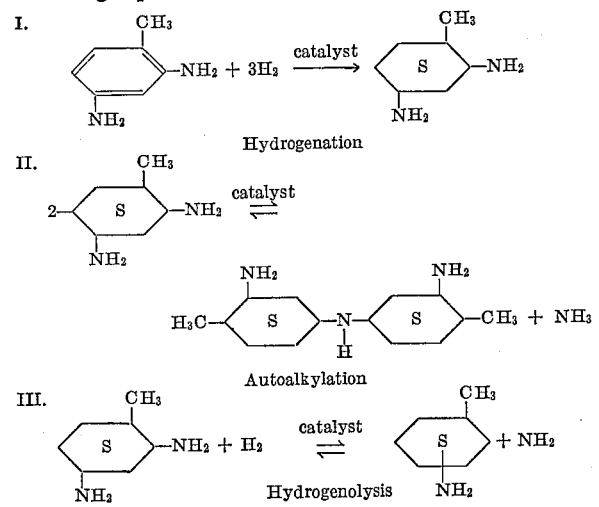

In Equation I above, tolylene diamine, which is represented throughout the equations as the 2,4-tolylene diamine isomer, is hydrogenated in the presence of a suitable catalyst to yield hexahydrotolylene diamine. It should be understood that throughout the equation, isomers of tolylene diamine other than the one set forth above, can also be hydrogenated and enter into the same reaction set forth, but, for the purpose of simplicity, the 2,4-isomer is shown. It is also possible, though less probable, for the autoalkylation reaction to occur by reaction of amine groups other than the p-amino groups. In Equation II, two mols of 2,4-hexahydrotolylene diamine undergo autoalkylation to yield a secondary amine plus ammonia. In the Equation III, hexahydrotolylene diamine reacts further with hydrogen in the presence of a catalyst to yield by hydrogenolysis a cycloaliphatic monoamine plus ammonia. Since either of the amino groups of the 2,4-hexahydrotolylene diamine can enter into the hydrogenolysis reactions the product is shown without indicating the position of the amino group. In both Equations II and III, ammonia is formed in addition to the organic compound shown. The presence of ammonia is also believed to be detrimental to the catalyst which is required for the hydrogenation to occur. After the reaction is completed, the product is distilled. After removal of the ammonia and small amounts of water, a mixture consisting essentially of cycloaliphatic monoamines plus other trace impurities is distilled over first. This fraction is hereinafter referred to as "low boiler." Next the main fraction, which is reduced tolylene diamine, is distilled over. Then a last or final fraction, which is mainly tolylene diamines, but contains traces of unknown impurities such as the secondary amine shown in Equation II, distills over. This last fraction is hereinafter referred to as "residue." By practicing the process in accordance with this invention, by including either the low boiler or the residue (tolylene diamine plus impurities) in the reaction along with the aromatic diamine, the Equations II and III are driven to the left thereby diminishing the formation of the ammonia and increasing the yield of the desired reduced diamine.

In the practice of this invention, any suitable hydrogenation catalyst may be used, such as, for example, nickel kieselguhr, Raney nickel, Raney cobalt, cobalt oxide, a cobalt oxide-calcium oxide mixture, ruthenium, palladium, platinum, rhodium, a mixture of cobalt oxide-calcium oxide in sodium carbonate, ruthenium dioxide, sodium ruthenate on carbon, platinum oxide and the like. It is preferred that the mixture of cobalt oxide-calcium oxide and sodium carbonate be used.

In the preparation of hexahydrotolylene diamine, any isomer or isomeric mixture of tolylene diamines can be used as the starting material. Commercially available isomeric mixtures are 80% 2,4- and 20% 2,6-tolylene diamines containing small quantities of other isomers and 65% 2,4-tolylene diamine and 35% 2,6-tolylene diamine containing small quantities of other isomers. These isomeric mixtures, in addition to substantially pure isomers, which have been separated from isomeric mixtures, generally contain small quantities of o-diamines such as, for example, 2,3- or 3,4-tolylene diamines. The invention described herein is suitable for the hydrogenation of all isomeric mixtures of tolylene diamine including those containing o-diamines.

In accordance with this invention, any quantity of low boiler or residue or both that is included along with the aromatic diamines will improve the yield obtained. However, it is preferred to include from about 10 to about 20% of this low boiler based on the quantity of tolylene diamine used and from about 3 to about 30% and for best results, from about 5 to 15% of the residue based on the quantity of tolylene diamine used.

In order to conduct the hydrogenation, suitable temperatures and pressures should be used. These reaction conditions are generally known and are not the basis of patentability of this invention. However, it is preferred that temperatures of at least 200° C. be used. Desirably, from about 200 to 300° C. should be used with temperatures within the range of from about 230° to 270° C. giving the best results. Any suitable pressure can be used, however, it is preferred that pressures within the range of 500 to 4000 p.s.i. be used.

The invention is further illustrated but not limited by the following examples in which parts are by weight unless otherwise specified.

EXAMPLE

General procedure

The quantity of tolylene diamine indicated the following table either free of or containing o-diamine as indicated, together with the quantity of residue and/or low boiler indicated in the table, are charged to a one-liter stainless steel autoclave and 30 parts of cobalt oxide, 45 parts of calcium oxide and 19.5 parts of sodium carbonate as catalyst are added. The autoclave is closed, purged with hydrogen gas to remove all oxygen present, heated to about 180° C. and stirred. The temperature is raised to that indicated in the table and the autoclave is pressurized with hydrogen to the pressure set forth. The reaction is continued for 2 to 3 hours, as indicated, at which time, the absorption of hydrogen has practically stopped. The autoclave is cooled to approximately 80 to 120° C. and the material discharged therefrom. The catalyst is removed from the amine and the centrifuge cake is washed with small amounts of methyl alcohol to remove the last amine from the catalyst. The methanol extract is combined with the filtrate and fractionally distilled.

previous reduction are charged together with the ingredients stated. About 137 parts of reduced tolylene diamine are obtained. This represents a yield of about 84%.

EXAMPLE 3C

The procedure of Example 3A is repeated, however, about 20 parts of low boiler are added in addition to the ingredients stated. About 127 parts of reduced tolylene are obtained. This represents a yield of about 78%.

EXAMPLE 3D

The procedure of Example 3A is repeated, however, about 20 parts of low boiler and 20 parts of residue are added in addition to the ingredients stated. About 153.5 parts of reduced tolylene diamine are obtained. This represents a yield of about 94%.

Although the invention has been described in considerable detail in the foregoing, it is to be understood that such detail is solely for the purpose of illustration and that many variations can be made by those skilled in the art without departing from the spirit and scope of the invention.

What is claimed is:

1. In the method of reducing tolylene diamine to hexahydrotolylene diamine by hydrogenating in the presence of a hydrogenation catalyst, the improvement which comprises charging a tolylene diamine and a member selected from the group consisting of low boiler comprising mainly cycloaliphatic monoamines obtained in hydrogenation of tolylene diamine and residue comprising mainly tolylene diamines obtained in the hydrogenation of tolylene diamine.

2. The process of claim 1 wherein the group member is low boiler.

3. The process of claim 1 wherein the group member is residue.

TABLE

| Example No. | Parts by weight | | | Temperature, °C. | Reaction [1] time in hours | Parts of low boiler | Distillate parts of TDA | Parts of residue | Yield, percent |
| --- | --- | --- | --- | --- | --- | --- | --- | --- | --- |
| | Low boiler | Tolylene diamine | Residue | | | | | | |
| 1A [2] | None | [3] 300 | None | 230 | 3 | 67.5 | 214.3 | 18 | 72.5 |
| 1B | None | [3] 300 | 40 | 230 | 3 | 17.1 | 300 | 19.2 | 89 |
| 1C | 30 | [3] 300 | None | 230 | 3 | 60 | 247 | 13.5 | 82.2 |
| 1D | 60 | [3] 286.5 | 13.5 | 230 | 3 | 71.5 | 271 | 18.2 | 92 |
| 2A [2] | None | [4] 300 | None | 230 | 3 | 49 | 229.5 | 13 | 76 |
| 2B | 40 | [4] 300 | 13 | 230 | 3 | 59 | 249 | 26.5 | 83 |
| 2C | 40 | [5] 300 | 13 | 230 | 2½ | 66.2 | 259.2 | 15.3 | 83 |

[1] The rate of hydrogenation is observed by pressuring the autoclave to 4,000 p.s.i. and permitting the pressure to drop to 3,500 p.s.i. then pressuring back to 4,000 p.s.i. and this is repeated until the period of time indicated lapses.
[2] Control, no low boiler or residue added.
[3] Pure 2,4-tolylene diamine free of other isomers.
[4] An isomeric mixture of 80% 2,4- and 20% 2,6-tolylene diamine containing approximately 3% o-diamine.
[5] An isomeric mixture of 80% 2,4- and 20% 2,6-tolylene diamine free of o-diamine.

It was observed on repeated runs using catalysts from the previous run that the yield diminished with each reuse of the catalyst, indicating that some poisoning effect on the catalyst has occurred.

EXAMPLE 3A (COMPARISON)

About 156 parts of 2,4-tolylene diamine substantially free of o-diamine isomers in about 600 parts by volume of dioxane as solvent, and about 5 grams of ruthenium dioxide are charged to a one-liter stainless steel autoclave. The autoclave is purged with hydrogen gas to remove all oxygen, heated to about 180° C. and stirred. The temperature is raised to about 144° C. at a pressure of about 4000 p.s.i for about 4½ hours at which time the absorption of hydrogen has substantially stopped. The autoclave is cooled and the contents distilled to remove solvent. The low boiler is removed with the solvent. The product contains about 115.2 parts of reduced tolylene diamine. This represents a yield of 70%.

EXAMPLE 3B

The procedure of Example 3A is repeated with the exception that about 20 parts of residue obtained in a 4. The process of claim 1 wherein both low boiler and residue are charged.

5. The process of claim 1 wherein the tolylene diamine is substantially free of ortho-diamine isomers.

6. The process of claim 1 wherein the low boiler is present in an amount of from about 10 to about 20% by weight based on the tolylene diamine charged.

7. The process of claim 1 wherein the residue is present in an amount of from about 3 to about 50% by weight based on the tolylene diamine charged.

8. The process of claim 1 wherein the hydrogenation is conducted at a temperature of at least 200° C.

9. The process of claim 1 wherein the catalyst is a cobalt oxide catalyst.

10. The process of claim 1 wherein the hydrogenation is conducted at a pressure of at least 500 p.s.i.

References Cited

UNITED STATES PATENTS 3,351,650  11/1967  Cross et al. _____ 260—453

CHARLES B. PARKER, *Primary Examiner.*

P. C. IVES, *Assistant Examiner.*